United States Patent [19]

Ogawa et al.

[11] Patent Number: 4,708,916
[45] Date of Patent: Nov. 24, 1987

[54] MOLTEN CARBONATE FUEL CELL

[75] Inventors: Takashi Ogawa, Yokohama; Tamotsu Shirogami, Yamato; Kenji Murata, Tokyo, all of Japan

[73] Assignee: Kabushiki Kaisha Toshiba, Kawasaki, Japan

[21] Appl. No.: 927,942

[22] Filed: Nov. 7, 1986

[30] Foreign Application Priority Data

Nov. 8, 1985 [JP] Japan .................................. 60-250482
Feb. 28, 1986 [JP] Japan .................................. 61-42935

[51] Int. Cl.$^4$ ............................................ H01M 8/24
[52] U.S. Cl. .......................................... 429/38; 429/39
[58] Field of Search .............................. 429/38, 39, 34

[56] References Cited

U.S. PATENT DOCUMENTS 3,436,272 4/1969 Gelting .................................. 429/39
3,994,748 11/1976 Kunz et al. ........................... 429/34
4,407,904 10/1983 Uozumi et al. ....................... 429/39

Primary Examiner—Donald L. Walton
Attorney, Agent, or Firm—Oblon, Fisher, Spivak, McClelland, & Maier

[57] ABSTRACT

In a stacked structure for forming a molten carbonate fuel cell according to the present invention, a plurality of unit cells are stacked, and separator elements are respectively interposed between the adjacent unit cells. First and second internal manifolds extend in the stacking direction, at both sides of the stacked structure. Third internal manifold extends at the center of the structure, in the direction of stacking. First fuel gas passages, communicating with the first and third internal manifolds, are formed at the anode side of the separator element. Second fuel gas passages, communicating with the second and third internal manifolds, are formed at the anode side of the separator element. Thus, the fuel gas flows through the first internal manifold, the first fuel gas passages and the third internal manifold, and the fuel gas flows through the second internal manifold, the second fuel gas passages and the third internal manifold. As a result, the current density distribution and the temperature distribution are uniform.

18 Claims, 17 Drawing Figures

FIG. 14
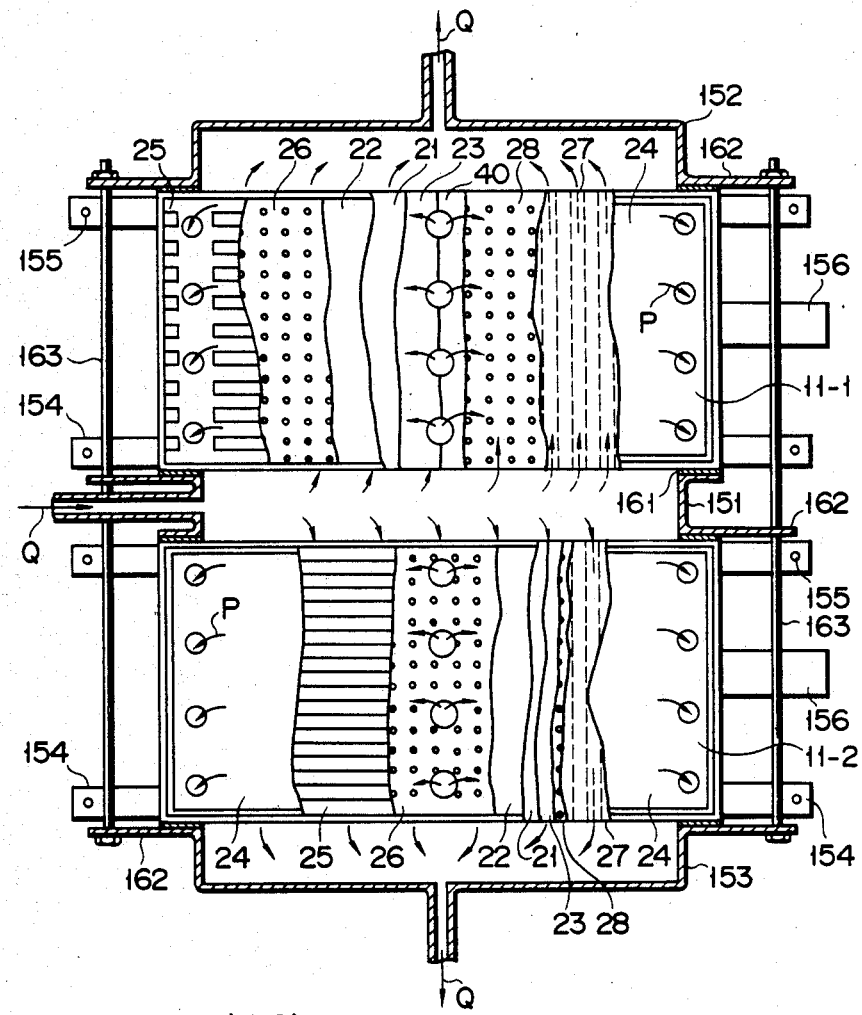
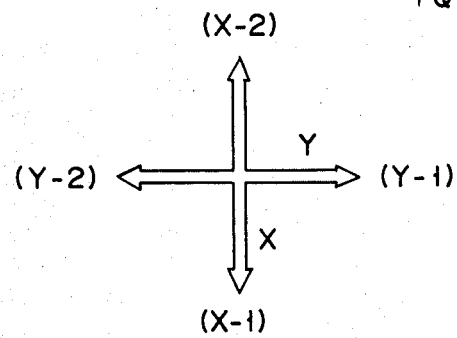

MOLTEN CARBONATE FUEL CELL

BACKGROUND OF THE INVENTION

The present invention relates to a fuel cell using a molten carbonate, such as alkali metal carbonate or alkali earth carbonate, as an electrolyte, to improve the passage of fuel and oxidant gases.

In a fuel cell of this type (hereinafter called "molten carbonate fuel cell"), electrode reactions occur when the electrolyte (i.e., a carbonate) is molten at high temperatures. Electrode reactions then occur more readily than in a phosphoric acid fuel cell or a solid electrolyte fuel cell. Hence, the molten carbonate fuel cell has a high power-generating efficiency, and requires no expensive metallic catalysts.

This fuel cell comprises a number of unit cells stacked one above another, and conductive separator plates each interposed between two adjacent unit cells. Many unit cells, each generating a low electromotive force of 1 V, are used and stacked to provide a greater electromotive force. Each unit cell has a porous anode electrode, a porous cathode electrode, and an electrolyte tile interposed between these electrodes. Each separator plate interposed between two unit cells electrically connects these unit cells, and has fuel gas passages for guiding a fuel gas (e.g., $H_2$ or $CO$) to the anode electrodes, and also oxidant gas passages for guiding an oxidant gas to the cathode electrodes.

The separator plates used at present can be classified into three types, in accordance with the positional relation between the fuel gas passages and oxidant gas passages, and with the directions in which both gases flow. The first is the so-called cross flow type in which the fuel gas passages extend at right angles to the oxidant gas passages. The second is the so-called co-flow type wherein all gas passages extend in parallel, and the fuel gas and oxidant gas flow in the same direction. The third is the so-called counterflow type wherein all gas passages extend in parallel, but the fuel gas and oxidant gas flow in opposite directions.

When the fuel gas and oxidant gas are continuously supplied to the anode electrode and cathode electrode of each unit cell, the following electrode reactions occur: In the anode electrode,

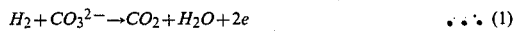

$$H_2 + CO_3^{2-} \rightarrow CO_2 + H_2O + 2e \qquad (1)$$

$$(CO + H_2O + \rightarrow CO_2 + H_2) \qquad (2)$$

In the cathode electrode,

$$1/2 O_2 + CO_2 + 2e \rightarrow CO_3^{2-} \qquad (3)$$

As these reactions proceed in the unit cells, the fuel cell generates electrical energy. As can be seen from formula (2), CO supplied as fuel gas does not react with the anode electrode, but reacts with $H_2$, thereby generating $H_2$. $H_2$, thus generated, reacts with the anode electrode, as according to formula (1).

It is desirable that the electrode reactions proceed uniformly on the entire electrode surfaces, so that the fuel cell can function reliably for a long period of time. However, the current density at the inlet of each of the fuel gas passages is twice as high as that at the outlet of the fuel gas channel, regardless of the type of separator plate used. Therefore, the electrical power becomes concentrated at the inlet portion of each fuel gas passages, or at the first one-third of the passages. For the same reason, heat generated by the electrode reactions is unevenly distributed over each separator plate. Hence, it is difficult for the fuel cell to generate stable electrical power for a long period of time.

The peripheral edge of each unit cell is wet-sealed with molten carbonate, whereby the reaction gases do not mix within the fuel cell. The fuel cell and an external manifold are also wet-sealed together, to prevent both reaction gases from leaking out. However, when the current density is unevenly distributed, as is described above, the fuel cell is inevitably subjected to thermal stress and subsequently becomes deformed. If this is the case, the fuel gas may leak out.

SUMMARY OF THE INVENTION

It is an object of the present invention to provide a molten carbonate fuel cell which can permit electrode reactions to proceed uniformly over the entire electrode surfaces, which can achieve uniform distributions of both current and temperature, to generate stable electrical power for a long period of time, and which can effectively prevent fuel gas from leaking out.

According to the present invention, there is provided a molten carbonate fuel cell comprising a plurality of unit cells stacked one above another, and a plurality of separator elements each interposed between two adjacent unit cells. Each unit cell comprises an anode and a cathode. The unit cells and separator elements each have first segment channels and second segment channels formed in two opposing end portions, respectively, and third segment channels formed at the center portion. First fuel gas passages are formed in each separator element, opening to the anode of the adjacent unit cell and connecting the first segment channels to the third segment channels. Second fuel gas passages are formed in each separator element, opening to the anode of the adjacent unit cell and connecting the second segment channels to the third segment channels. The first segment channels communicate with one another, thereby forming a first internal manifold connected to the first fuel gas passages, to guide the fuel gas. The second segment channels communicate with one another, thus forming a second internal manifold connected to the second fuel gas passages, to guide the fuel gas. The third segment channels communicate with one another, thereby forming a third internal manifold connected to the first and second fuel gas passages, to guide the fuel gas. Hence, the first internal manifold, first fuel gas passages, and third internal manifold constitute a circuit for the fuel gas. Similarly, the second internal manifold, second fuel gas passages, and third internal manifold from a circuit for the fuel gas. Thus, the fuel gas passages, which undergo electrode reactions, are relatively short. This permits the electrode reactions to proceed uniformly over the entire electrode surfaces. Therefore, the current density and temperature can be distributed evenly, and the fuel cell can generate stable electric power for a long period of time.

BRIEF DESCRIPTION OF THE DRAWINGS

FIG. 14 is a lateral sectional view of the fuel cell in FIG. 13;

DETAILED DESCRIPTION OF THE PREFERRED EMBODIMENTS

Figure 1:
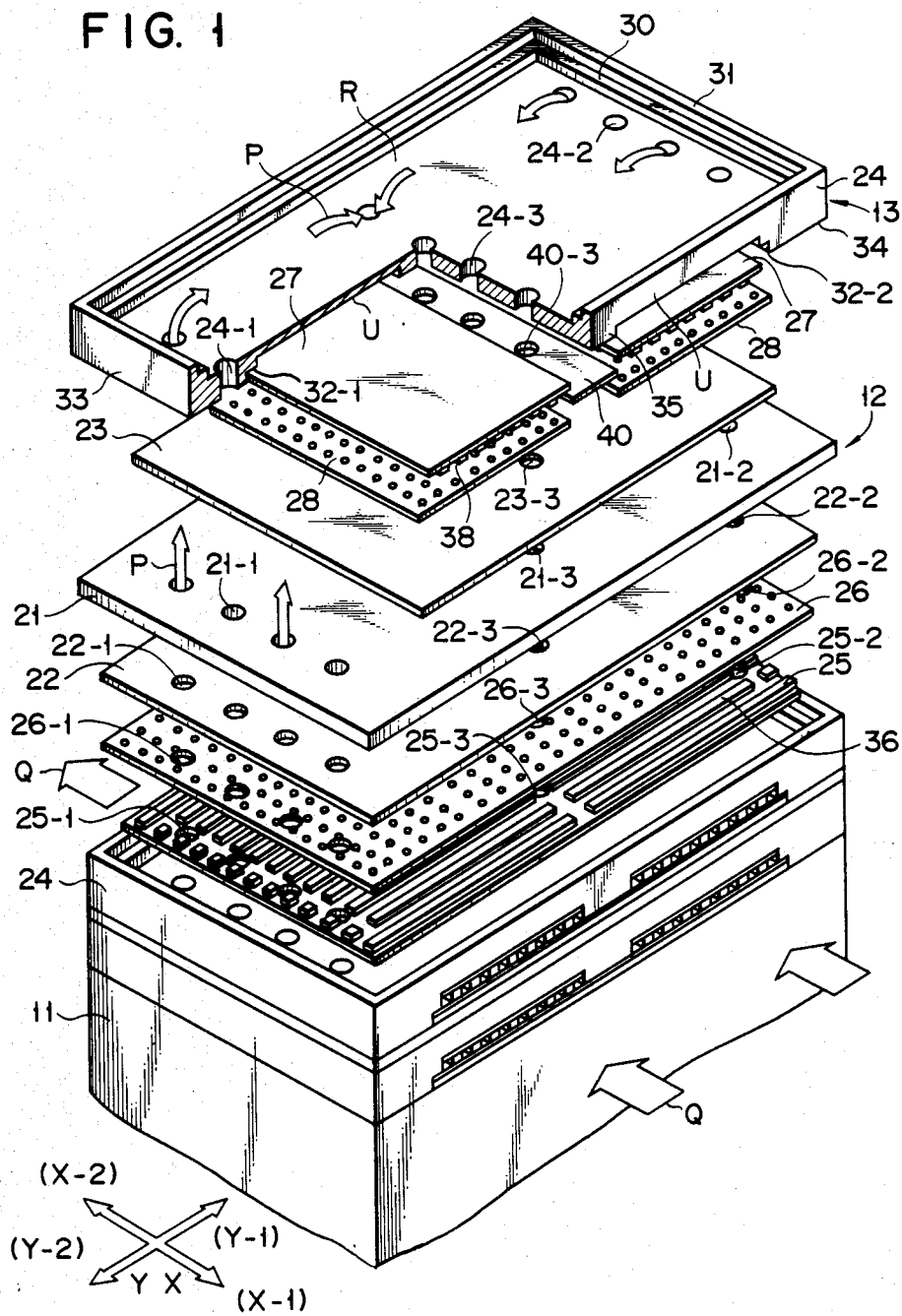
FIG. 1 is an exploded perspective view of a stacked structure for forming a molten carbonate fuel cell according to a first embodiment of the present invention.

FIG. 1 shows a first embodiment of a molten carbonate fuel cell according to the present invention. A plurality of unit cells 12, each formed in the shape of a thin rectangular plate, are stacked in stacked structure 11 for forming the fuel cell, and separator elements 13 are interposed between adjacent unit cells 12. The two or four directions in the fuel cell are designated by arrows X (X-1, X-2), Y (Y-1, Y-2) shown in FIG. 1, for ready explanation of the embodiment.

Unit cell 12 has electrolyte tile 21 of rectangular shape, anode electrode 22 of substantially the same shape as tile 21 and located on the lower surface side of tile 21, and cathode electrode 23 of substantially the same shape as tile 21 but shortened in the Y direction and located on the upper surface of tile 21.

Tile 21 is formed, for example, by mixing fine powders of $LiAlO_2$ and $K_2CO_3$-$Li_2O_3$, and hot pressing the resultant mixture. A plurality of openings 21-1 and 21-2 aligned in the X direction, are formed at the positions near both ends of the Y direction of tile 21. A plurality of openings 21-3 aligned in the X direction, are formed at the center of tile 21, in the Y direction.

Anode electrode 22 is formed, for example, of a porous nickel alloy having 3 to 6 $\mu$m diameter pores and 60 to 80% porosity. A plurality of openings 22-1 and 22-2 aligned in X direction, are formed at the positions near the ends of electrode 22, in the Y direction, corresponding to openings 21-1 and 21-2 of tile 21. A plurality of openings 22-3 aligned in X direction, are formed at the positions at the center of electrode 22 corresponding to openings 21-3 of tile 21.

Cathode electrode 23 is formed, for example, of a porous nickel alloy having 6 to 15 $\mu$m diameter pores and 70 to 80 % porosity. A plurality of openings 23-3 aligned in X direction, are formed at the positions at the center of electrode 23 corresponding to the positions of openings 21-3 of tile 21.

Separator element 13 has separator plate 24, fuel gas channel plate 25 located on the upper surface of plate 24, and punched metal plate 26 located on the upper surface of plate 25. Element 13 additionally has a pair of oxidant gas channel plates 27 and a pair of punched metal plates 28 situated on the lower surface of plate 24.

Separator plate 24 has wall 31 formed with stepped portion 30 on the upper surface of the peripheral edge thereof. Ridges 33 and 34 having stepped portions 32 and extending in the X direction, are respectively formed on both ends of the lower surface of plate 24, in the Y direction. Ridge 35 extending in the X direction, is formed at the center of the lower surface of plate 24. Wall 31 seals a space surrounded by wall 31, i.e., a space R for taking in the fuel gas from outside. Grooves U extending in the X direction, are defined by three ridges 33 to 35. A plurality of openings 24-1, 24-2, and 24-3 are formed at the positions of plate 24 corresponding to openings 21-1, 21-2, and 21-3 of tile 21.

Fuel gas channel plate 25 has a plurality of channels 36 extending to guide the fuel gas in the Y direction, and formed on the upper surface thereof. A plurality of openings 25-1, 25-2, and 25-3 are formed at the positions of plate 25 corresponding to openings 21-1, 21-2, and 21-3 of tile 21. Openings 25-1 to 25-3 communicate with channels 36, thereby to guide the fuel gas from openings 25-1 to 25-3 to channels 36.

Punched metal plate 26 is formed in substantially the same shape as anode electrode 22, has a plurality of pores for supplying the fuel gas from plate 25 to anode electrode 22, and has current-collecting function. A plurality of openings 26-1 and 26-2 are formed at the ends of plate 26 corresponding to the positions of openings 21-1 and 21-2 of tile 21, and, additionally, a plurality of openings 26-3 are formed at the positions at the center of plate 26 corresponding to the positions of openings 21-3 of tile 21.

A pair of oxidant gas channel plates 27 are formed to engage with a pair of grooves U formed on the lower surface of plate 24. A plurality of channels 38 extending in the X direction, are formed in the direction perpendicular to the extending direction of channels 36 of plate 25 on the lower surface of plate 27.

A pair of punched metal plates 28 are formed to engage with a pair of grooves U, together with plates 27. Plates 28 have a plurality of pores for supplying the oxidant gas from plate 27 to cathode electrode 23, and additionally have current-collecting function.

Inorganic tape 40, used for sealing against leaks out exhaust gas, is interposed between ridge 35 formed at the center of the lower surface of plate 24 and cathode electrode 23. A plurality of openings 40-3 are formed at the positions of tape 40 corresponding to the positions of openings 21-3 of tile 21. Tape 40 is formed, for example, of a nonwoven fabric impregnated with carbonate.

Fuel cell 11, thus constructed as described above, is assembled in the manner described below.

Firstly channel plate 25 is engaged within space R for taking in the fuel gas on the upper surface of plate 24. Metal plates 26 and anode electrodes 22 are mounted on the upper surface of channel plate 25, to engage with stepped portion 30 of wall 31. Channel plates 27 engage with grooves U of the lower surface of plate 24. Metal plates 28 are mounted on the lower surface of channel plates 27, to engage with stepped portions 32-1, 32-2 of ridges 33, 34. Tape 40 is placed on the lower end face of ridge 35. Cathode electrode 23 is located on the lower surfaces of metal plates 28 and tape 40. Tile 21 is situated between cathode electrode 23 and anode electrode 22. In this manner, a number of cells 12 are stacked via separator elements 13. Thus, stacked structure 11 for forming the fuel cell is completed.

As has been precisely described, openings (21-1, 22-1, ...) formed at the respective members communicate, thus forming cylindrical spaces or channels which extend in the direction in which the members are stacked on upon another. The cylindrical spaces, which are formed by the openings cut in the members at both ends set apart in the Y direction, are used as manifolds S (first and second internal manifolds) to intake the fuel gas. The cylindrical spaces, which are formed by the openings cut in the members at the center, are used as manifolds T (third internal manifolds) to exhaust the fuel gas. In other words, these cylindrical spaces and spaces R for taking in the fuel gas, form the internal manifolds of the stacked structure.

External manifolds for taking in and exhausting fuel gas P, not shown, are disposed on the lower surface of the fuel cell. External manifolds for taking in oxidant gas Q, not shown, are disposed, in the X-1 direction, at the side of stacked structure 11, and external manifolds for exhausting oxidant gas Q, not shown, are disposed at the side opposite the intake manifolds.

Figure 2:
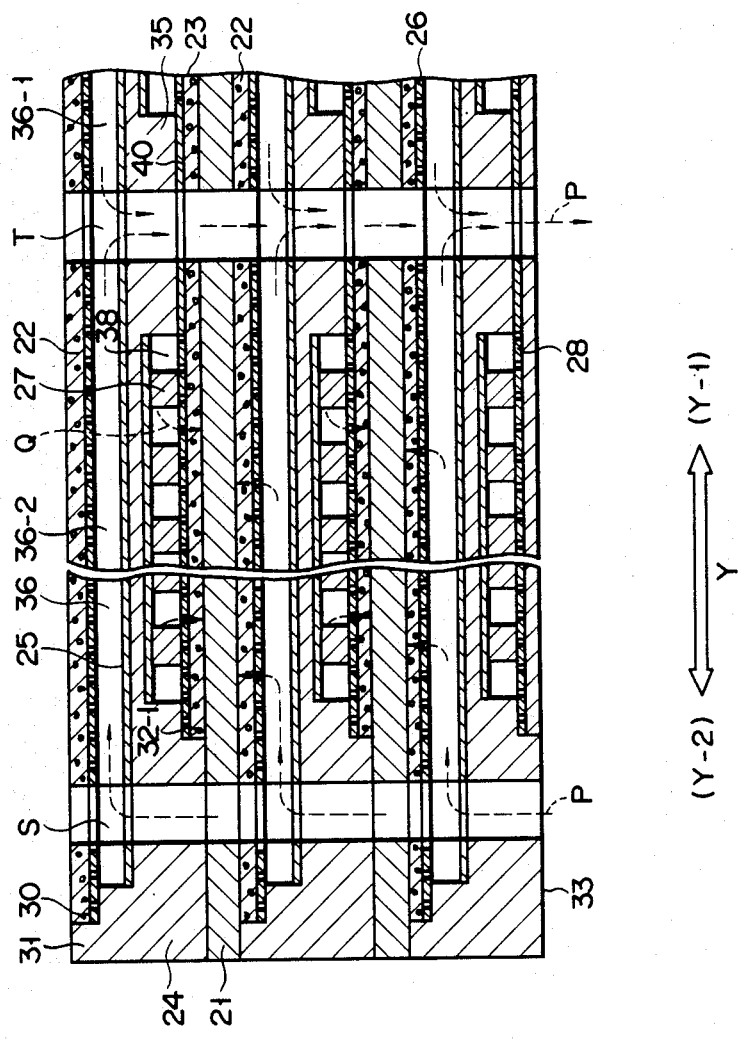
FIG. 2 is a sectional view of the stacked structure in FIG. 1 taken along the direction of an arrow Y of FIG. 1.

The fuel gas supplied from the external manifolds is fed forward, through two intake manifold S, up to the stacked structure, and is distributed to channels 36 of channel plate 25, as is shown in FIG. 2. Fuel gas P, taken into channels 36, is fed forward, through first channels 36-1, in the Y-2 direction, and through second channels 36-2, in the Y-1 direction. Fuel gas P is then supplied through the pores of metal plate 26, to anode electrode 22, where it is subjected to electrode reactions with electrode 22. Having completed electrode reactions, fuel gas P is fed forward through exhaust manifold T, to be exhausted downward, through the center of the stacked structure, and is then exhausted externally through the external manifolds.

Oxidant gas Q, supplied from external manifolds, is fed forward through channels 38 of channel plate 28, in the direction perpendicular to the feed direction of fuel gas P (cross flow type). Oxidant gas Q is then supplied through the pores of metal plate 28, to cathode electrode 23, where it is subjected to electrode reactions with electrode 23. Having completed electrode reactions, oxidant gas Q is exhausted externally through the exhaust manifolds, in the X-2 direction.

When fuel gas P is flowing thus, it is prevented from leaking externally, by means of a wet seal formed between tile 21 and wall 31 or ridges 33, 34 of plate 24. The manifold for oxidant gas Q are sealed by means of the wet seal formed between tile 21 and wall 31 or ridges 33, 34 of plate 24. The manifold for oxidant gas Q is further sealed by means of the wet seal formed by molten carbonate oozing out of tape 40 and tile 21 to electrode 23. In this way, fuel gas P and oxidant gas Q can be prevented from mixing.

Products according to the invention were made on an experimental basis, and were then tested.

Plate-shaped electrolyte tile 21 having a width of 50 cm, a length of 100 cm, and a thickness of 0.15 cm was used. This tile 21 was formed by adding approx. 5% by weight of polyethylene to a mixture of $LiAlO_2$, $K_2CO_3$, and $Li_2O_3$ in a mixing ratio of 40:32:28 by weight, and the resultant mixture was hot-pressed at 250° C., under a pressure of approx. 500 tons. Four openings each of 21-1 and 21-2 of 2.5 cm diameter were formed at intervals of 11 cm, in the X direction, at positions of 4.5 cm from the ends of tile 21 in the Y direction. Four openings 21-3 of 3 cm diameter were formed at an interval of 11 cm in the X direction, at the center of tile 21.

Anode electrode 22 was made of sintered porous Ni-Cr (10%) alloy having 4 to 6 $\mu m$ diameter pores and 75% porosity. Electrode 22 was formed having a thickness of 0.86 mm, a width of 46 cm, and a length of 96 cm.

Cathode electrode 23 was made of porous Ni plate having 8 to 12 $\mu m$ diameter pores and 70 to 80% porosity. Electrode 23 was formed having a thickness of 0.40 mm, a width of 50 cm, and a length of 86 cm.

Electrodes 22 and 23 had openings 22-1 to 22-3 and 23-3 formed at the positions corresponding to the openings of tile 21, and had the same diameter as the openings of tile 21.

Separator plate 24 was made of a clad plate of SUS316/Ni in a shape having a thickness of 0.4 mm, a width of 50 cm, and a length of 100 cm. Wall 31 formed of Ni having a thickness of 2 mm and a width of 3 cm was bonded by welding to the peripheral edge of the surface of Ni side of plate 24. A stepped portion having a width of 5 mm and a depth of 0.5 mm was formed on the inner side of wall 31. Ridges 33, 34 made of SUS316 in a shape having a thickness of 2.5 mm and a width of 70 mm were fastened by welding to both ends of plate 24 made of SUS316. A stepped portion 32 having a width of 5 mm and a depth of 1 mm was formed on the inner sides of ridges 33, 34. Ridge 35 made of SUS316 having a thickness of 1.5 mm and a width of 80 mm was fastened by welding to the center of plate 24. Four openings each of 24-1 and 24-2 having 2.5 cm diameter were formed at an interval of 11 cm in the X direction at positions 4.5 cm from the ends of plate 24. Four openings 24-3 of 3 cm diameter were formed at intervals of 11 cm in the X direction, at the center of plate 24.

Fuel gas channel plate 25 was made of an Ni plate in a shape having a thickness of 1.5 mm, a width of 44 cm, and a length of 94 cm. Channels 36 having 5 mm pitch, a depth of 1 mm and a width of 3 mm were formed on the upper surface of channel plate 25.

Punched metal plate 26 was made of Ni plate having a thickness of 0.1 mm, a width of 46 cm, and a length of 96 cm, and was formed with pores of 1 mm diameter, so that the pores occupy 33% of the entire area.

Punched metal plate 28 was made of a pair of SUS316 having a thickness of 0.2 mm, a width of 50 cm and a length of 39 cm, and perforated similarly to metal plate 26.

Inorganic tape 40 was made of a sealing material impregnating a zirconia nonwoven fabric with $LiKCO_3$.

Ten sets of the unit cells made of the members described above were stacked to construct a stacked structure of 4.1 kW. Fuel gas and oxidant gas were supplied to the fuel cell under the conditions of 70% of fuel gas capacity factor, 50% of oxidant gas capacity factor, 650° C. temperature, atmospheric pressure, and 0.16 A/cm$^2$ current density. In comparison, in a conventional co-flow type fuel cell in which fuel gas passages and oxidant gas passages were disposed in parallel, and through which fuel gas and oxidant gas flow in the same direction, electrical power was generated under the same conditions, as a comparison example 1. In a conventional cross-flow type fuel cell in which fuel gas passages and oxidant gas passages are disposed perpendicular to each other, electrical power was generated under the same conditions, as a comparison 2. The experimental results obtained from the operating of these example fuel cells are shown in Table 1.

TABLE 1

|  | Average voltage | Maximum voltage | Minimum voltage |
| --- | --- | --- | --- |
| This embodiment | 0.74 | 0.75 | 0.72 |
| Comparison example 1 | 0.71 | 0.75 | 0.68 |
| Comparison example 2 | 0.71 | 0.75 | 0.67 |

As is apparent from the experimental results, the average voltage of the unit cells is higher in the embodiment of this invention, compared to comparison examples 1 and 2, and voltage irregularity among the unit cells is less.

In the first embodiment described above, the fuel gas flows in two directions within the one stacked structure of the fuel cell, thereby eliminating the locations where the current density distribution becomes high, as happens in the conventional fuel cell. More particularly, the electrode reactions proceed uniformly on all the electrodes. Thus, the current density distribution is equalized, to thereby ensure a uniform temperature distribution. As a result, the fuel cell can stably generate electrical power for a long period of time.

Now, a second embodiment of the present invention will be described with reference to FIGS. 3 and 4.

Figure 3:
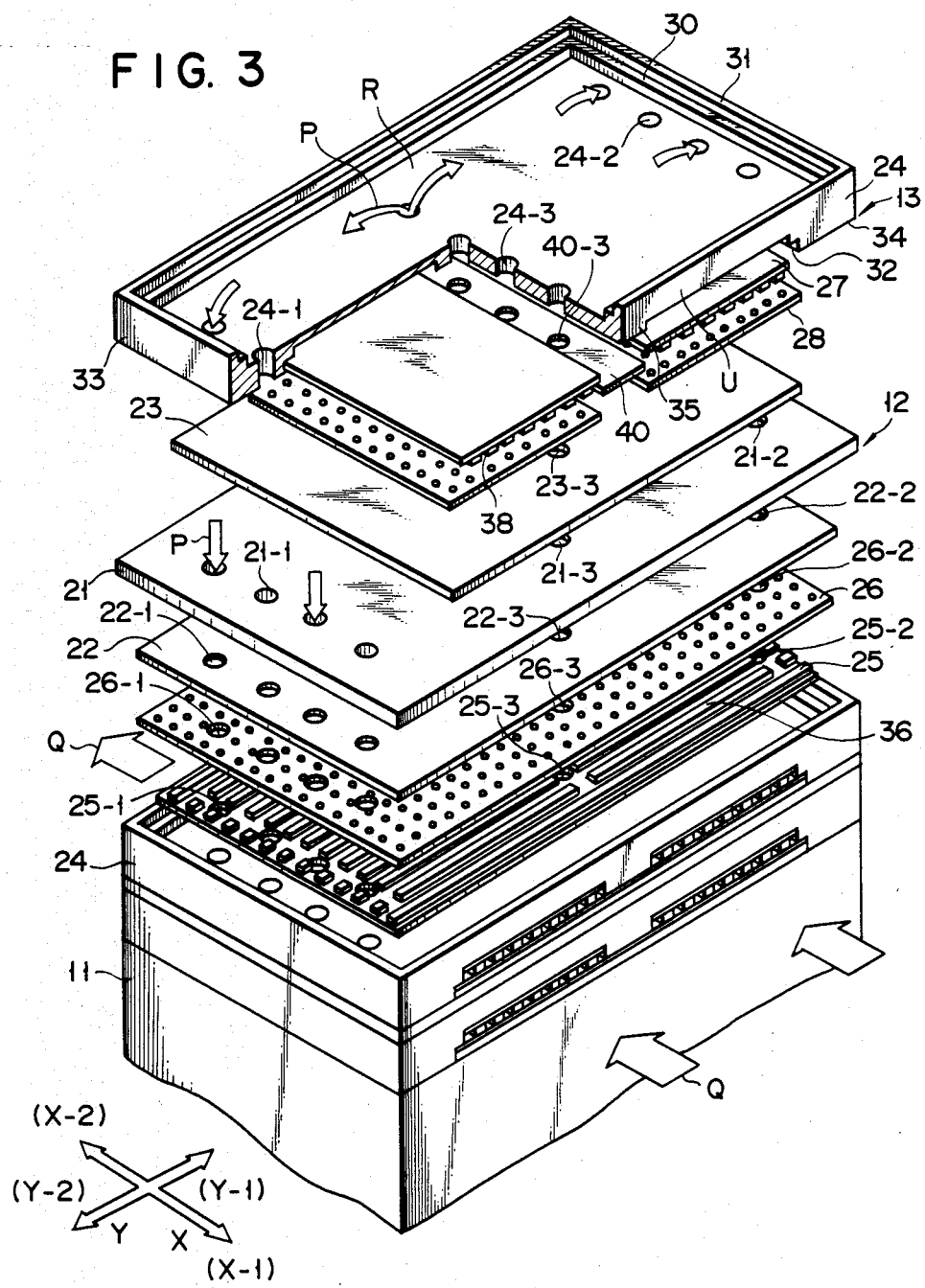
FIG. 3 is an exploded perspective view of a stacked structure for forming a fuel cell according to a second embodiment of the present invention.
Figure 4:
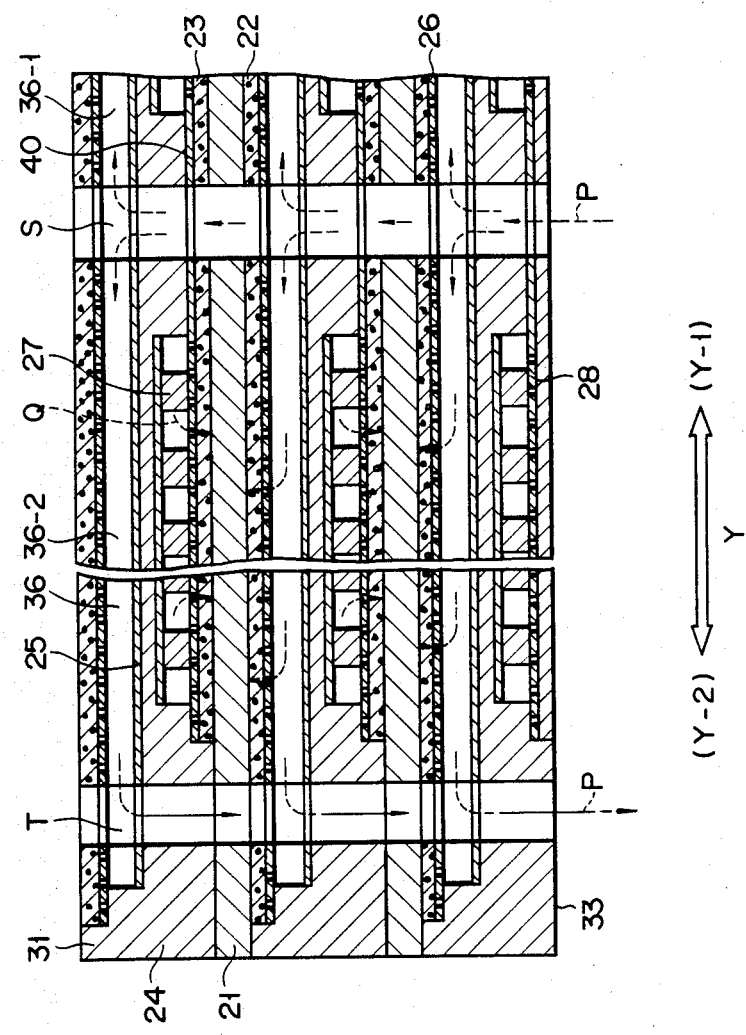
FIG. 4 is a sectional view of the stacked structure in FIG. 3 taken along the direction of an arrow Y of FIG. 3.

In a fuel cell of the second embodiment, shown in FIGS. 3 and 4, stacked structure 11 has similar construction to that of the first embodiment, but the direction of flow of the fuel gas differs from that of the first embodiment. In the first embodiment, the fuel gas is supplied through intake manifold S formed at both ends of stacked structure, and exhaust through exhaust manifold T formed at the center. However, in the second embodiment, the fuel gas is supplied through intake manifold S formed at the center, and exhausted through exhaust manifold T formed at both ends.

More specifically, the fuel gas supplied from the external manifolds is fed upward and forward, through intake manifold S, as is shown in FIG. 4, and is distributed to channels 36 of fuel gas channel plates 25. Fuel gas P is fed forward through first passages 36-1, in the Y-1 direction, and through second passages 36-2, in the Y-2 direction. Fuel gas P is supplied through the pores of punched metal plates 26 to anode electrode 22. Having completed electrode reactions, fuel gas P is fed through exhaust manifold T in downward direction of the stacked structure, and exhausted externally through the external manifolds.

Oxidant gas flows in a similar manner to the first embodiment in the second embodiment.

The experiments using the fuel cell of the second embodiment were executed with stacked structures shown in the first embodiment. The results were entirely the same as those of the first embodiment.

Thus, in the second embodiment, the fuel gas flows in two directions in one unit cell, thereby permitting the electrode reactions to proceed uniformly on all the electrodes. Thus, the current density distribution and the temperature distribution are uniform throughout the electrodes.

Now, a third embodiment of the present invention will be described with reference to FIGS. 5 to 12. In this third embodiment, the construction of the internal manifolds for the fuel gas is the same as that of the first and second embodiments, but the direction of flow of the fuel gas differs therefrom that of the first embodiment. Further, the direction of flow of the oxidant gas also differs from the two previous embodiments.

Figure 5:
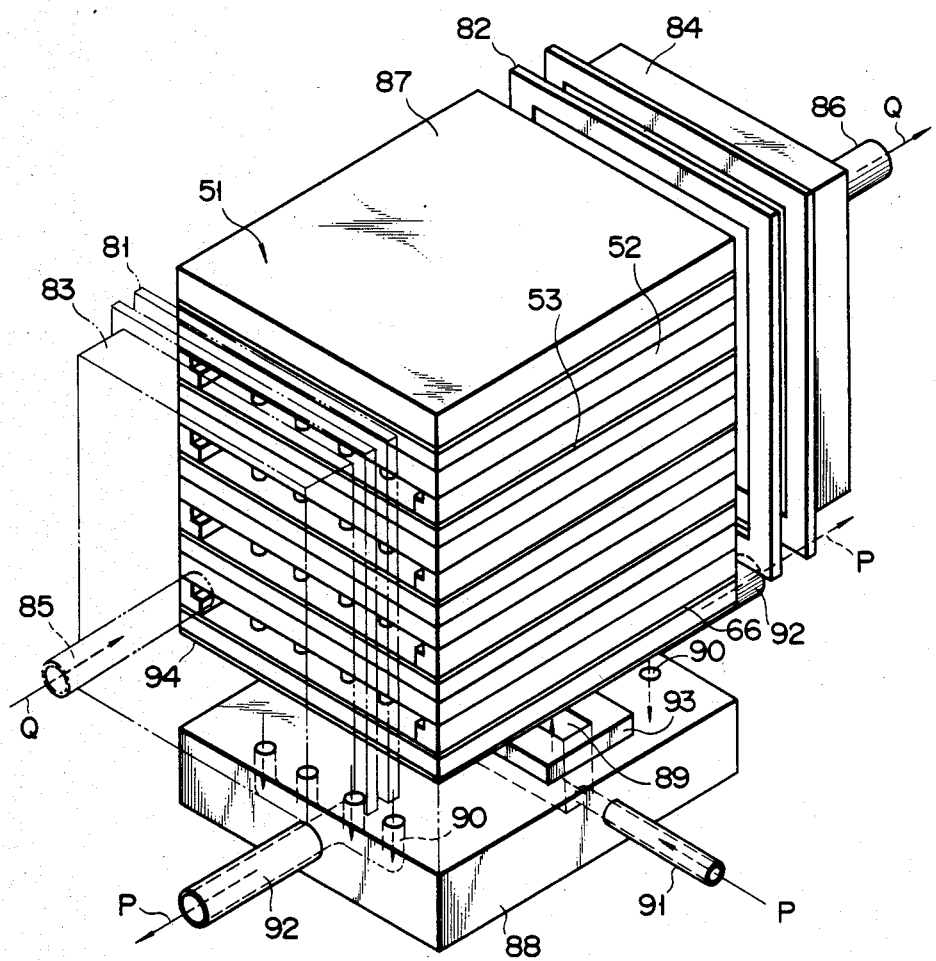
FIG. 5 is an exploded perspective view of a molten carbonate fuel cell according to a third embodiment of the present invention.

In FIG. 5, stacked structure 51 for forming a fuel cell has a plurality of unit cells 52 each formed in a thin rectangular plate shape and stacked, with separator elements 53 interposed between unit cells 52.

Figure 6:
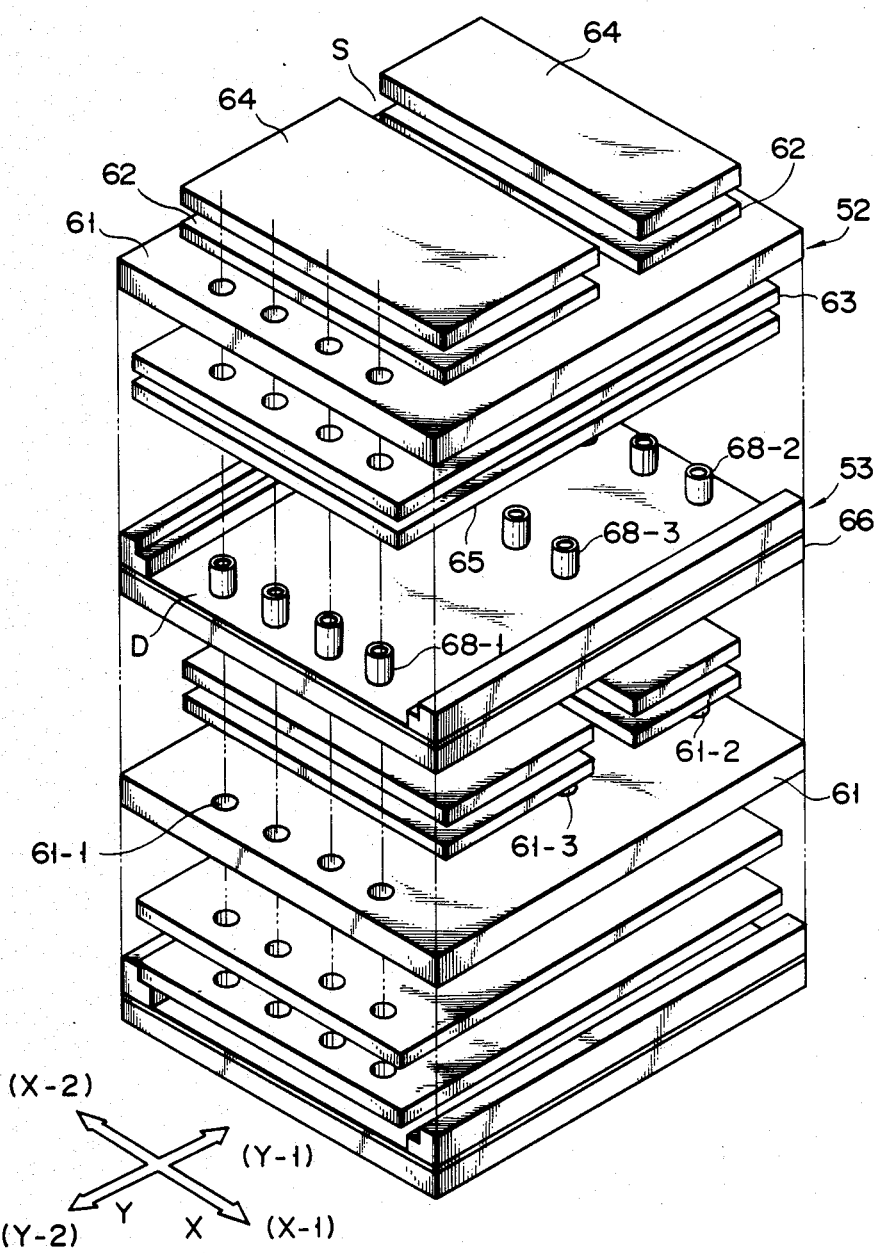
FIG. 6 is an exploded perspective view of a stacked structure for forming the fuel cell shown in FIG. 5.

As is shown in FIG. 6, unit cell 52 has anode electrode 62 and cathode electrode 63 both made of porous nickel alloy. An electrolyte tile 61 is interposed between electrodes 62 and 63. An anode collector plate 64 is provided on the upside of electrode 62, and a cathode collector plate 65 is provided on the downside of electrode 63. Electrode 62 and plate 64 are split via an interval S in the Y direction. Anode collector plate 64 is made, for example, of nickel spongy metal. Cathode collector plate 64 is made, for example, of stainless steel (SUS316) spongy metal. In tile 61, carbonate electrolyte produced by mixing, for example, lithium carbonate or potassium carbonate is held by a ceramic retainer such as lithium aluminate. A plurality of openings 61-1, 61-2, and 61-3 are respectively formed at an equal interval in the X direction, at both ends in the Y direction and at the center of tile 61.

Figure 7:
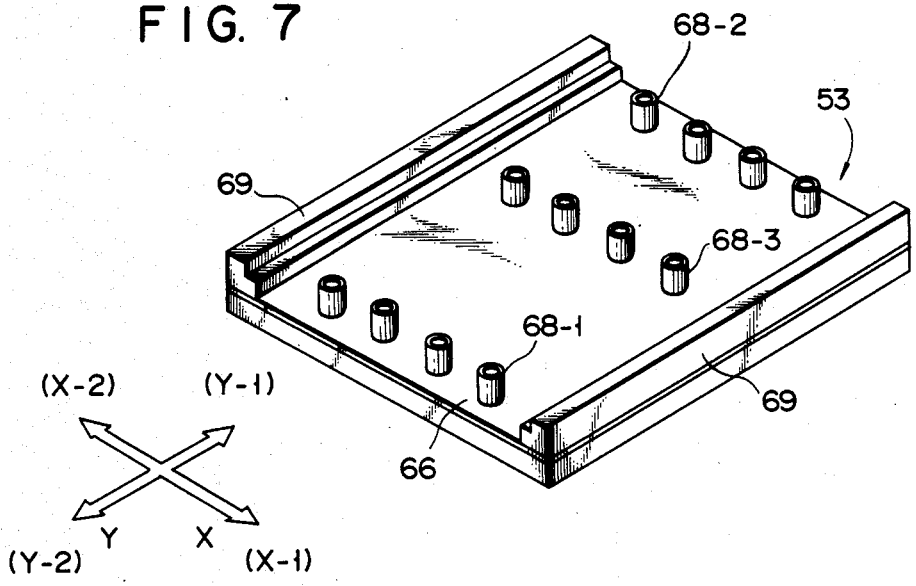
FIG. 7 is a perspective view showing a separator plate for forming the stacked structure in FIG. 6 as seen from a cathode side.
Figure 8:
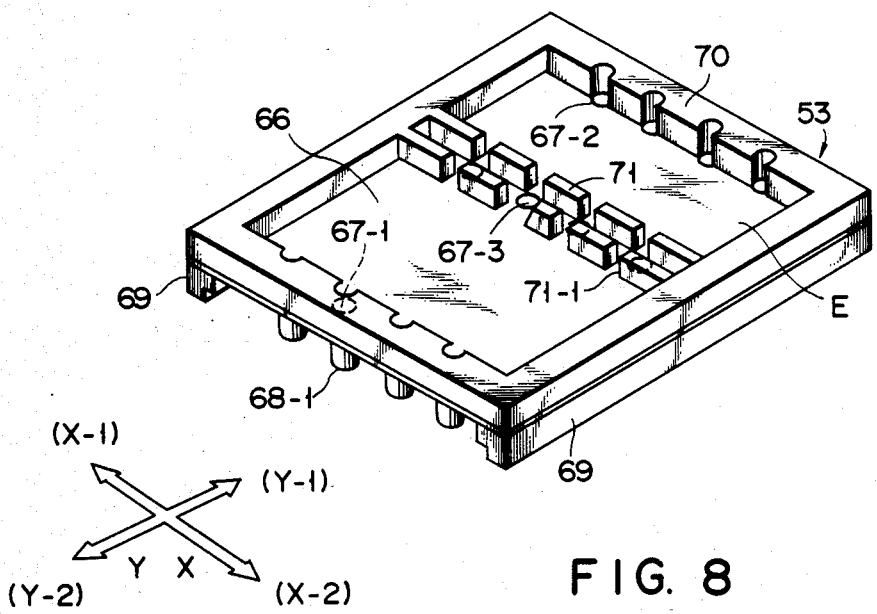
FIG. 8 is a perspective view showing a separator plate for forming the stacked structure in FIG. 6 as seen from an anode side.

As is shown in FIGS. 7 and 8, a separator plate 66 of thin plate shape formed of a conductive material, is provided on element 53. A plurality of cylindrical conduits 68-1, 68-2, and 68-3 for supplying and exhausting fuel gas are formed at the cathode side of plate 66 corresponding to openings 61-1, 61-2, and 61-3 of tile 61. A plurality of through-openings 67-1, 67-2, and 67-3 are respectively formed at the positions of plate 66 corresponding to conduits 68-1, 68-2, and 68-3. Stepped ridges 69 extending in the Y direction, are formed at both ends of plate 66 in the X direction, at cathode side thereof. Ridges 69 define oxidant gas passages D shown in FIG. 10, and prevent the oxidant gas from leaking in the X direction. Plate 65 is engaged between ridges 69, and electrode 63 is engaged on the stepped portion of ridge 69.

Annular ridge 70 is formed at the peripheral edge of plate 66, at the anode side. Ridge 70 forms fuel gas passages E, shown in FIG. 10, and prevents the fuel gas from leaking from the unit cell. Electrode 62 and anode current-collecting plate 64 are engaged within ridge 70. Ridge 71 extending in the X direction, and having cutouts 71-1 spaced at predetermined intervals, is formed at the center of plate 66, to surround a plurality of through-openings 67-3. The fuel gas is dispersed from openings 67-3 to channels E, through cutouts 71-1. When ridge 71 is formed of a porous material, cutouts 71-1 can be eliminated, so that the dispersing function of the fuel gas is improved.

The above-mentioned conduits 68-3 form fuel gas intake manifold S (third internal manifold), jointly with openings 67-3. Conduits 68-1 and 68-2 form fuel gas exhaust manifolds T (first and second internal manifolds), jointly with openings 67-1 and 67-2. Conduits 68-1 to 68-3 are formed, for example, of an insulating material such as alumina. The lengths of conduits 68-1 to 68-3 are equal to that produced by adding together the thickness of plate 65 and of electrode 63.

As is shown in FIG. 5, external manifolds 83, for supplying oxidant gas to stacked structure 51 from the exterior are provided on annular zirconia felt 81 laid on the side of stacked structure 51, in the Y-2 direction. External manifolds 84, for exhausting oxidant gas from stacked structure 51 to the exterior, are provided on annular zirconia felt 82 laid on the surface side of structure 51, in the Y-1 direction. Conduits 85 for taking in oxidant gas Q are provided in manifolds 83, and conduits 86 for exhausting oxidant gas Q are provided in manifolds 84. Zirconia felt 81, 82 function as retainers in case of forming a wet seal between the side face of structure 51 and manifolds 83, 84.

End plates 87 and 88 are provided on the upper and lower surfaces of structure 51. Fuel gas external manifold 89, for guiding fuel gas P to conduits 68-3, are provided at the center of plate 88 of the lower surface of structure 51. Fuel gas external manifold 90, for guiding fuel gas P exhausted from conduits 68-1, 68-2 to the exterior, are provided at both ends of plate 88, in the X direction. Conduit 91, for guiding fuel gas P, is connected with manifold 89, and fuel exhaust conduit 92 for guiding fuel gas P is connected with external manifold 90. Wall 92 is formed at the peripheral edge of the outlet of external manifold 89 on the upper surface of plate 88. When wall 93 is in close contact with the lower surface of plate 66 disposed above wall 93, intake and exhaust fuel gases are kept separate from each other. Plate 88 is in close contact, via a gasket 94, with plate 66.

The assembled state of the fuel cell, thus constructed as described above, is shown in FIG. 10. The fuel gas and the oxidant gas are supplied to the fuel cell, and the fuel cell generates an electric current. These steps will now be described.

When the fuel cell is heated to a predetermined operating temperature, the electrolyte is wet, and wet seals are respectively formed between wall 93 and separator plate 66 and between conduits 68-1 to 68-3, annular ridge 70 and tile 61. In this state, fuel gas P is fed through conduits 91 and external manifold 89 to fuel gas intake manifold S. The fuel gas is fed upwardly, in FIG. 10, through intake manifold S. Fuel gas P is taken separately into anode current collector plate 65 and is fed in the Y-1 and Y-2 directions during feeding. At this time, fuel gas P is supplied to anode electrode 62, it then arrives at exhaust manifolds T. It is fed downwardly therethrough, and is then exhausted through external manifold 90 and conduits 92.

Oxidant gas Q is guided through conduit 85 and manifolds 83, to passages D. Oxidant gas Q is fed in channels D, in the Y-1 direction. At this time, the directions of feed of oxidant gas Q and fuel gas P are opposed to the direction of feed of the fuel gas (counterflow type), until oxidant gas Q is fed from the inlet to the center. When oxidant gas Q is fed from the center to the outlet in the Y-1 direction, the directions of feed of oxidant gas Q and fuel gas P are the same (co-flow type). More specifically, in the third embodiment, the counterflow type and the parallel flow type are combined. Then, oxidant gas Q is exhausted externally through manifolds 84 and conduits 86. Thus, when both the gases are supplied to electrodes 62 and 63, electrode reactions occur, and the fuel cell generates electrical energy.

Figure 11:
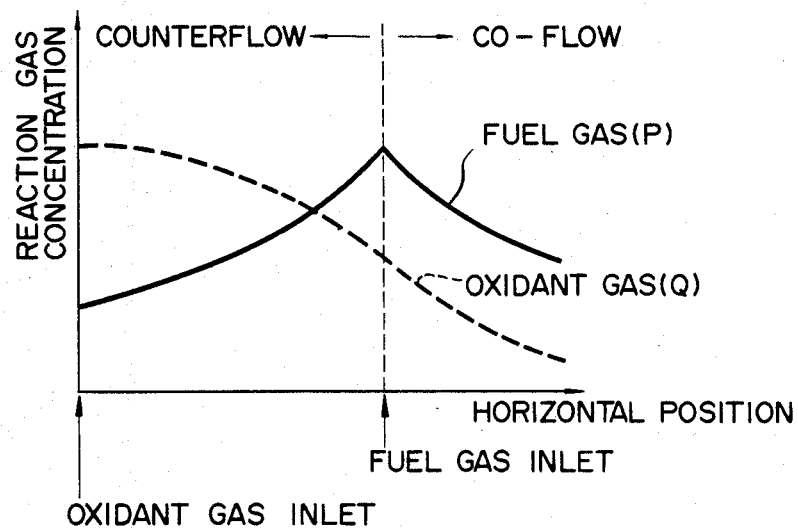
FIG. 11 is a graph showing the relationship between the horizontal position of the fuel cell and reaction gas concentration.
Figure 12:
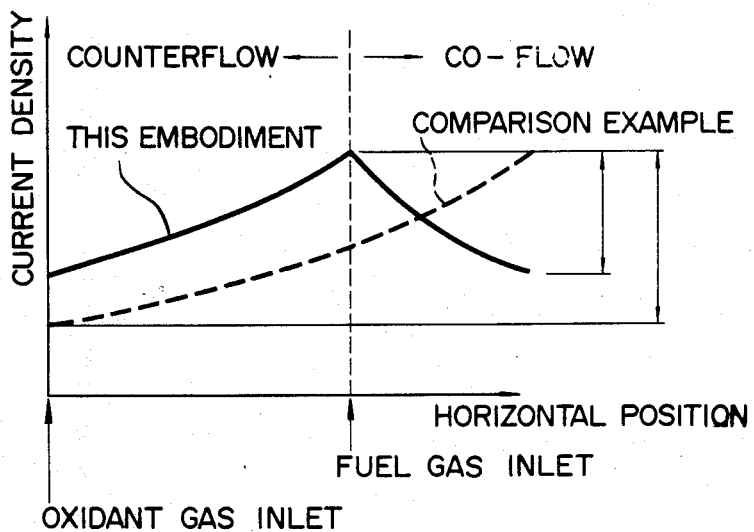
FIG. 12 is a graph showing the relationship between the horizontal position of the fuel cell and current density.

FIG. 11 is a graph showing the relationship between the horizontal position of the fuel cell in the Y direction and the concentration of reaction gas. The concentration of the fuel gas is highest at the center, and that of the oxidant gas is highest near the inlet. When the oxidant gas counterflows to the fuel gas, from the inlet to the center, the oxidant gas is gradually consumed by the electrode reactions occurring at this time. Fuel gas of high concentration is supplied to the center the oxidant gas is consumed at a low rate. Thus, when the oxidant gas flows from the center to the outlet, in parallel with the fuel gas, the electrode reactions are further accelerated. Therefore, as is shown in FIG. 12, the current density is highest at the center, and slowly decreases toward the Y-1 and Y-2 directions. Since the temperature in the fuel cell is determined by the extent of the electrode reactions, the temperature distribution is proportional to the current density distribution. The current density distribution of the case wherein the oxidant gas flows only in the Y-2 direction (counterflow type) is designated by a broken line. As is apparent from FIG. 12, the irregularity of the current density can be reduced as compared to the counterflow-only type.

In the third embodiment described above, both the reaction gases counterflow at the inlet side of the oxidant gas, and flow in parallel with the oxidant gas, at the outlet side. Thus, the current density distribution and the temperature distribution become more uniform than that of the conventional type. Furthermore, the reaction efficiency is improved, thereby reducing thermal stress within the fuel cell.

In the embodiment described above, the electrolyte is molten, and wet seals are respectively formed between wall 93 and separator plate 66, and between conduits 68-1 to 68-3, annular ridge 70 and tile 61. Thus, fuel gas P and oxidant gas Q do not mix, and fuel gas P is prevented from leaking externally. Further, since cooling means for cooling the fuel cell can be provided on both side faces of structure 51, in the Y direction, as will be described later, the oxidant gas is not supplied in excess as coolant.

According to the experiments conducted by the inventor of the present invention, the advantages of the embodiment were confirmed. More particularly, low BTU was used as the fuel gas and air/$CO_2$=70/30 was used as oxidant gas to the fuel cell of this embodiment. The fuel cell was operated under conditions of 800K inlet gas temperature, 25% fuel gas capacity factor, and 0.85 V voltage of the unit cell. As a result, irregularity of current density was less, and the average current density was 230 mA $cm^2$ as compared to 180 mAl $cm^2$ of the conventional fuel cell. The average current density was also improved by 16% as compared to the conventional fuel cell. In the conventional fuel cell, the temperature of the oxidant gas at the inlet was 810K, the temperature at the outlet was 1020K, and the temperature difference was 210K. However, in this embodiment, the temperature of the gas at the inlet was 810K, the temperature at the outlet was 970K, and the temperature difference was 160K. Therefore, in this embodiment, the temperature difference is reduced by approx. 30%, compared to the conventional fuel cell.

Figure 9:
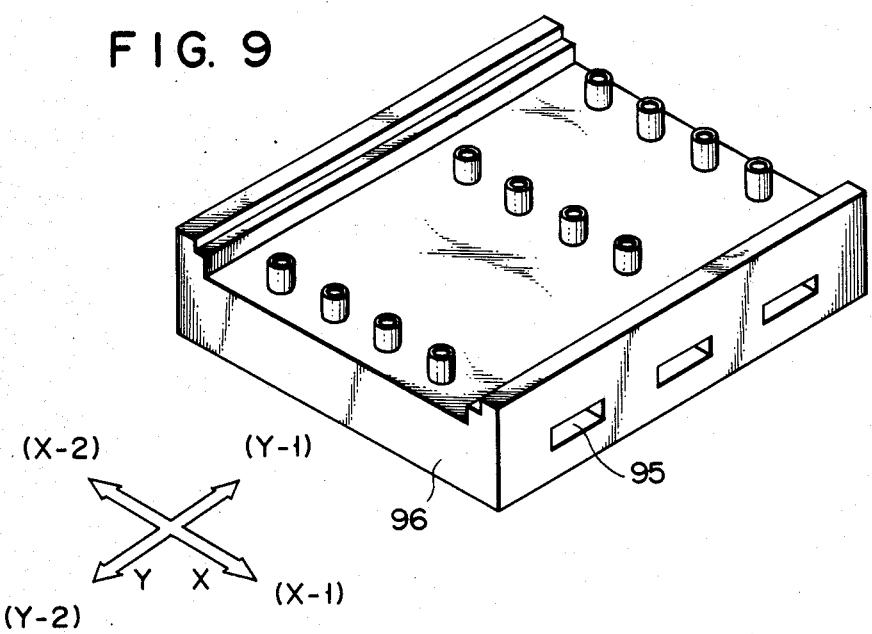
FIG. 9 is a perspective view showing a separator plate formed with coolant gas channels for forming the stacked structure in FIG. 6 as seen from a cathode side.
Figure 10:
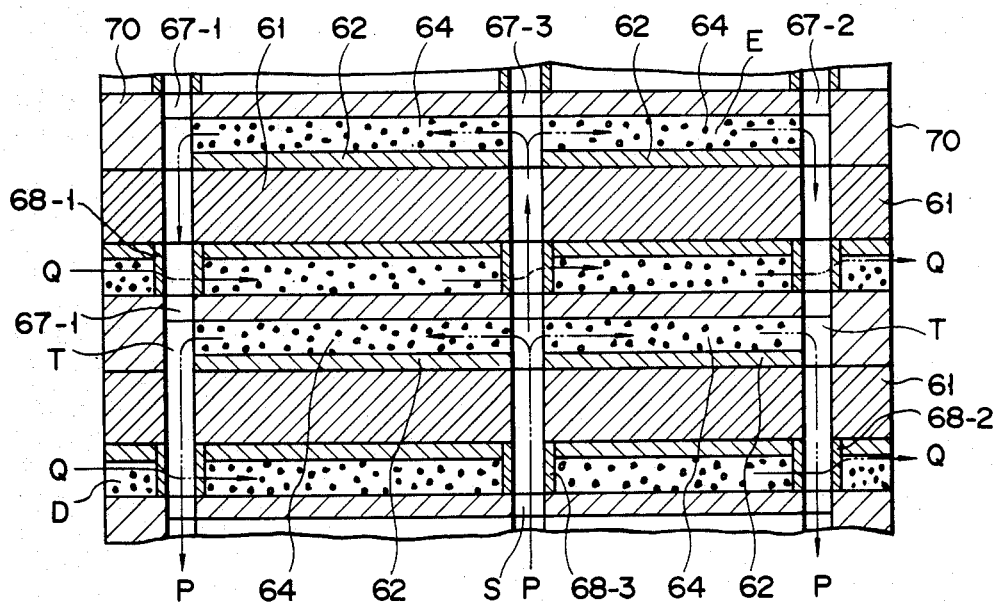
FIG. 10 is a sectional view of the stacked structure in FIG. 6 as seen in the direction of an arrow Y in FIG. 6.

When coolant gas is supplied to the fuel cell, separator plates 96 formed with coolant gas passage 95 are used as shown in FIG. 9. Coolant gas passages 95 perpendicularly cross the oxidant gas passages. The coolant gas is supplied through external manifolds provided at both ends of the fuel cell, in the X direction. The coolant gas and the oxidant gas may be flowed by return flow. The inlet of the fuel gas passages may be set at the optimum position, as required. In this embodiment, the inlet of the fuel gas passages is located away a little from the center.

The fourth embodiment of the present invention will now be described with reference to FIGS. 13 to 16.

In the first to third embodiments described above, electric power concentration at a particular location is prevented by the flow of the fuel gas in two directions within one fuel cell. However, in the fourth embodiment, oxidant gas also flows in two directions, to further prevent the power from concentrating. In other words, in a molten carbonate fuel cell according to this fourth embodiment, the oxidant gas is supplied from between two stacked structures 11-1 and 11-2, and is exhausted from those sides of structures 11-1, 11-2 which face away from each other, as shown in FIGS. 13 and 14.

Figure 15:
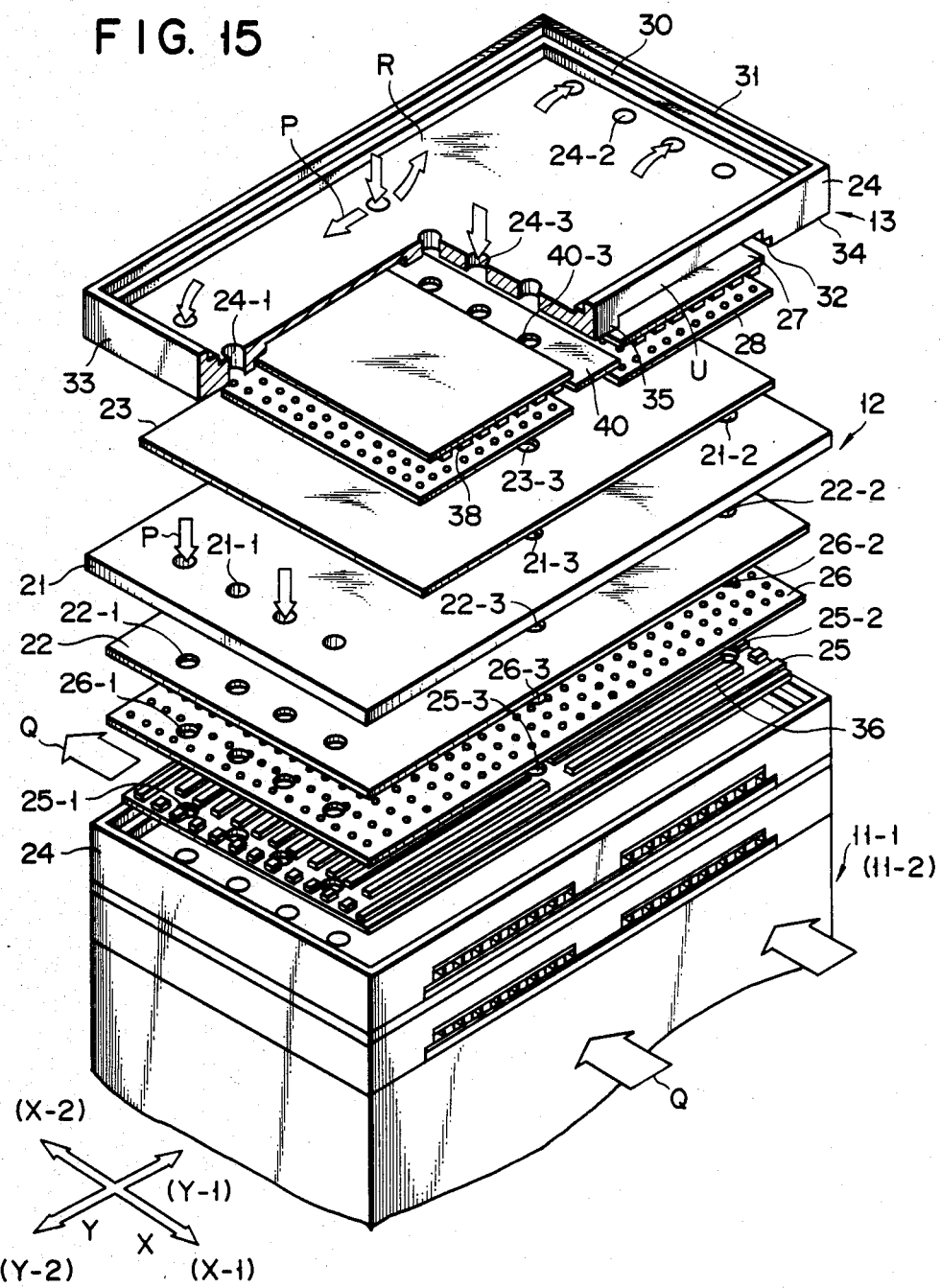
FIG. 15 is an exploded perspective view of a stacked structure for forming the fuel cell in FIG. 13.

As is shown in FIG. 15, two stacked structures 11-1 and 11-2 have entirely the same structure as those of the first and second embodiments. Therefore, the same reference numerals as those of the first and second embodiments designate the same or equivalent parts, and a detailed description of the internal construction of the stacked structure will therefore be omitted.

Figure 13:
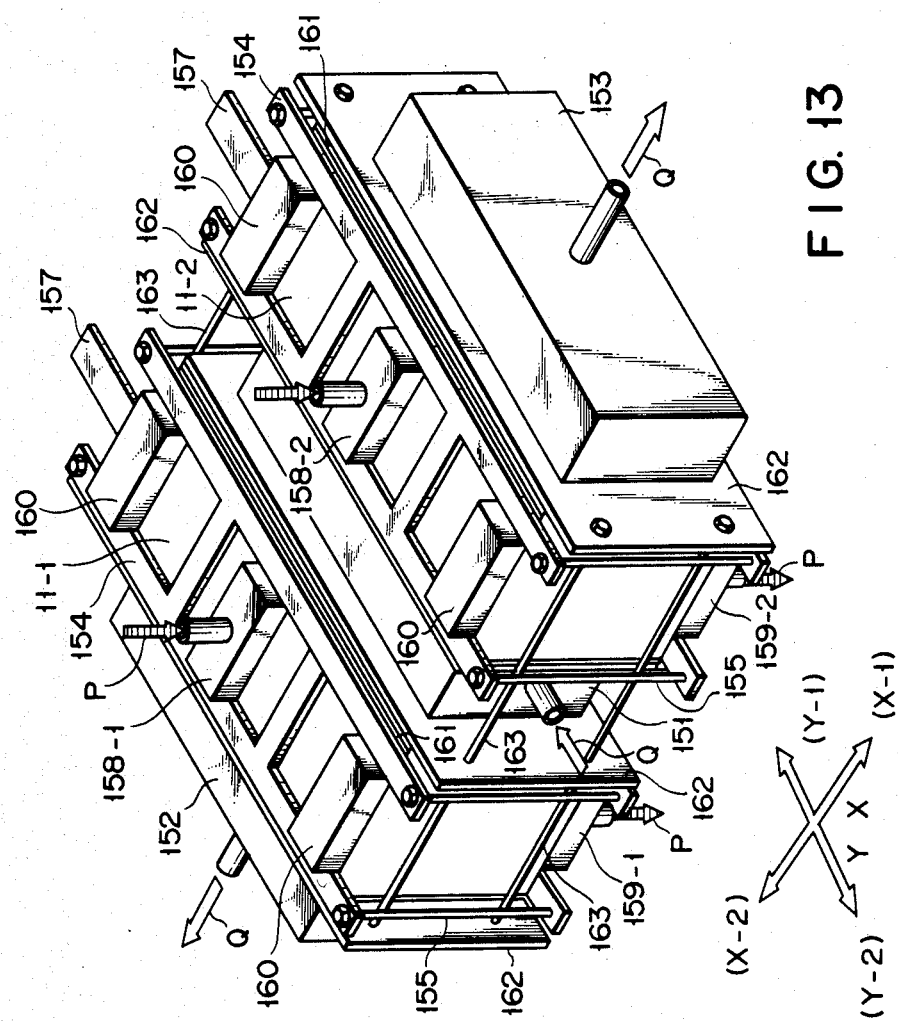
FIG. 13 is a perspective view of a fuel cell according to a fourth embodiment of the present invention.

As is shown in FIG. 13, in stacked structures 11-1 and 11-2, respectively, a pair of clamping members 154 located on the upper and lower surfaces of stacked structure are clamped by bolts 155. Positive electrode leads 156 (FIG. 14) and negative electrode leads 157 are mounted between members 154 and fuel cells 11-1 and 11-2. External manifolds 158-1 and 158-2, for supplying fuel gas, are situated on the upper ends of intake manifold S. External manifolds 159-1 and 159-2, for exhausting fuel gas, are situated at the lower ends of exhaust manifold T. Boxes 160, for closing the upper ends of the exhaust manifold T to form a buffer space, are provided at both ends of fuel cells 11-1 and 11-2, in the Y direction.

Stacked structures 11-1 and 11-2 are connected via external manifolds 151 for supplying oxidant gas. External manifolds 152 and 153, for exhausting oxidant gas, are formed on those sides of stacked structure 11-1 and 11-2 which face away from each other. At this time, spacers 161 for sealing, are interposed between manifolds 151, 152, 153, and stacked structures 11-1, 11-2. Thus, the sealability and electric insulation therebetween are secured. Four fins 162 are further interposed between manifolds 151, 152, 153, and stacked structures 11-1, 11-2. Fins 162 are clamped in the X direction by bolts 163 penetrating the four corners of each fin. Thus, manifolds 151 are prevented from being removed.

Figure 16:
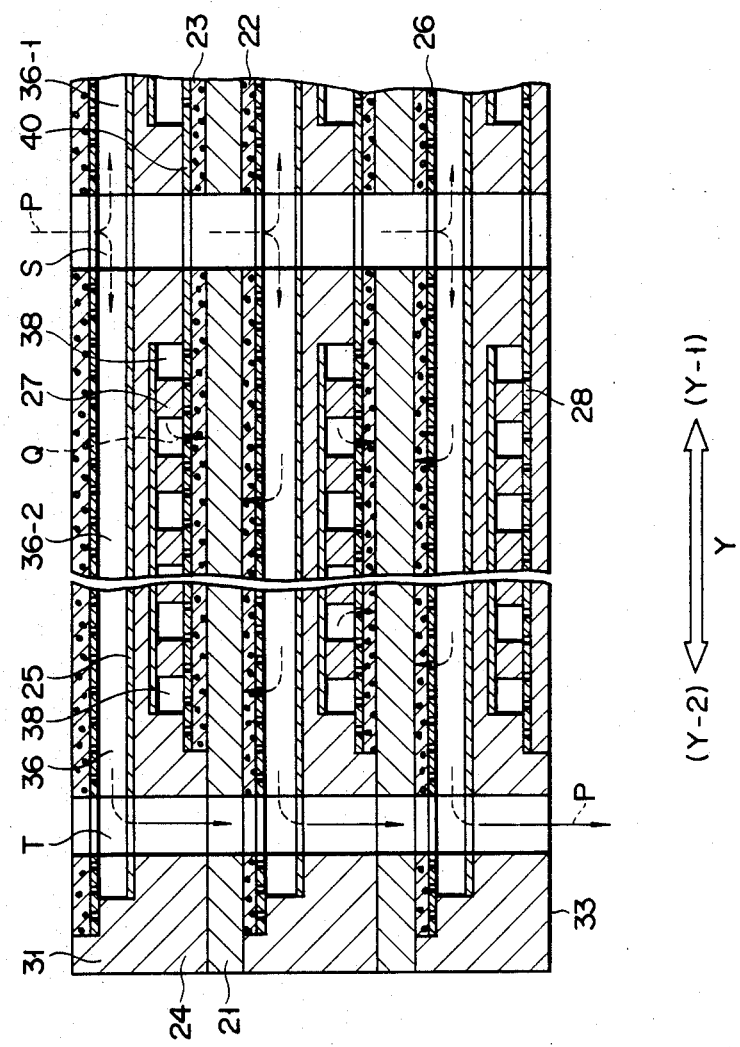
FIG. 16 is a sectional view of the stacked structure in FIG. 15 taken along the direction of an arrow Y of FIG. 15.

In this embodiment, the construction of the internal manifolds for the fuel gas is the same as those of the first and second embodiments, but the direction of flow of the fuel gas differs slightly. Fuel gas P, taken in through manifolds 158-1, 158-2, is fed downwardly through the intake manifold S, at the center of the stacked structures, as is shown in FIG. 16, and is distributed among channels 36 of fuel gas channel plate 25. Fuel gas P, taken into channels 36, is fed in first passages 36-1, in the Y-1 direction, and in second passages 36-2, in the Y-2 direction. Fuel gas P is supplied through the pores of punched metal plates 28, to anode electrode 22, and is subjected to electrode reaction therewith. Having completed electrode reactions, fuel gas P is fed downwardly through exhaust manifold T, and is exhausted through external manifolds 159-1, 159-2.

As is shown in FIG. 14, the flow of oxidant gas Q, taken in through external manifolds 151, is divided and supplied to two fuel cells 11-1 and 11-2. Oxidant gas Q is fed in grooves 38 (FIG. 16) of oxidant gas channel plates 27 to perpendicularly cross the direction of feed of fuel gas P. Oxidant gas Q is supplied through the pores of punched metal plates 28, to electrode 23, and is subjected to electrode reactions therewith. Having completed electrode reactions, oxidant gas Q is exhausted through external manifolds 152, 153, to the exterior. Thus, oxidant gas Q flows in two directions.

Products according to the invention were made on an experimental basis, and were tested.

The specification of stacked structures 11-1 and 11-2 used in the experiments was the same as that of the stacked structure used for the experiments in the first and second embodiments, and thus a detailed description of the former will be omitted. Fins 162 were made of an alloy plate composed mainly of iron, nickel, and aluminum 2 cm thick. The alloy plate is heat-treated at 800° to 1000° C., in an oxidized atmosphere, and is made of an aluminum oxide on surface of the plate. External manifolds 151 to 153, of the same material as fin 162, and formed in a shape 10 mm thick, 55 mm high, 900 mm long, and 100 mm wide, were formed with fins 162 as one unit. Sealing material, produced by impregnating zirconia nonwoven cloth with $LiKCO_3$, was engaged between manifolds 151 to 153 and the stacked structures. Bolts of 15 mm diameter were used as clamping bolts 163.

Fuel cells 11-1, 11-2, external manifolds 158-1, 158-2, 159-1, 159-2, external manifolds 151 to 153, and positive and negative electrode leading terminals 158, 157 were disposed at predetermined positions, and were fastened by clamping members 154. A panel plate which was composed of two plates and a member was used as clamping members 154. Two plates made of SUS316 and formed in a shape of, for example, 15 mm thick, 6 cm wide, and 125 cm long, were disposed in parallel. The member 10 cm wide was bridged at a suitable interval between two plates. Clamping members 154 were disposed on the upper and lower surfaces of the stacked structures, and the stacked structure was clamped by a bolt of 1 cm diameter penetrating the clamping members 154. Stacked structure 11-1 and 11-2 were clamped by bolts 163, through external manifolds 151. The output of the molten carbonate fuel cell constructed as described above was 8.2 kW.

Fuel gas P and oxidant gas Q were supplied to the fuel cell under the conditions of 70% of fuel gas capacity factor, 50% of oxidant gas capacity factor, 650° C. temperature, ambient pressure, and 0.16 Al $cm^2$ current density, and electrical energy was then generated from the fuel cell. Experiments were carried out under the same conditions as those of one stacked structure of the first embodiment having a reaction area equal to that of this embodiment, as comparison example 1, the conventional co-flow type having a reaction area equal to that of this embodiment, as comparison example 2, and the conventional cross flow type having a reaction area equal to that of this embodiment, as comparison example 3. The experimental results of the unit cells in the respective examples are shown in Table 2.

TABLE 2

| | Average voltage (V) | Maximum voltage (V) | Minimum voltage (V) | Temperature difference (°C.) |
|---|---|---|---|---|
| This embodiment | 0.76 | 0.77 | 0.75 | 55 |
| Comparison example 1 | 0.74 | 0.78 | 0.72 | 95 |
| Comparison example 2 | 0.71 | 0.78 | 0.68 | 105 |
| Comparison example 3 | 0.71 | 0.78 | 0.67 | 110 |

As is apparent from the experimental results, the temperature difference in the fuel cell is further reduced, as compared with comparison examples 1 to 3. Further, the average voltages in the respective unit cells are higher, and voltage irregularity among the unit cells is less.

In the fourth embodiment described above, the fuel gas flows in two directions, as does also the oxidation gas, thereby shortening the flow passages of the fuel gas and the oxidant gas (e.g., in this embodiment, it is understood that fuel gas and oxidant gas of high concentration are supplied to four electrodes each having ¼ of the reaction area of those of comparison example 2). Thus, the electrode reactions proceed uniformly on the entire electrode surfaces, and the current density distribution and temperature distribution are uniform throughout electrode surfaces. As a result, the fuel cell can stably generate for a long period.

Figure 17:
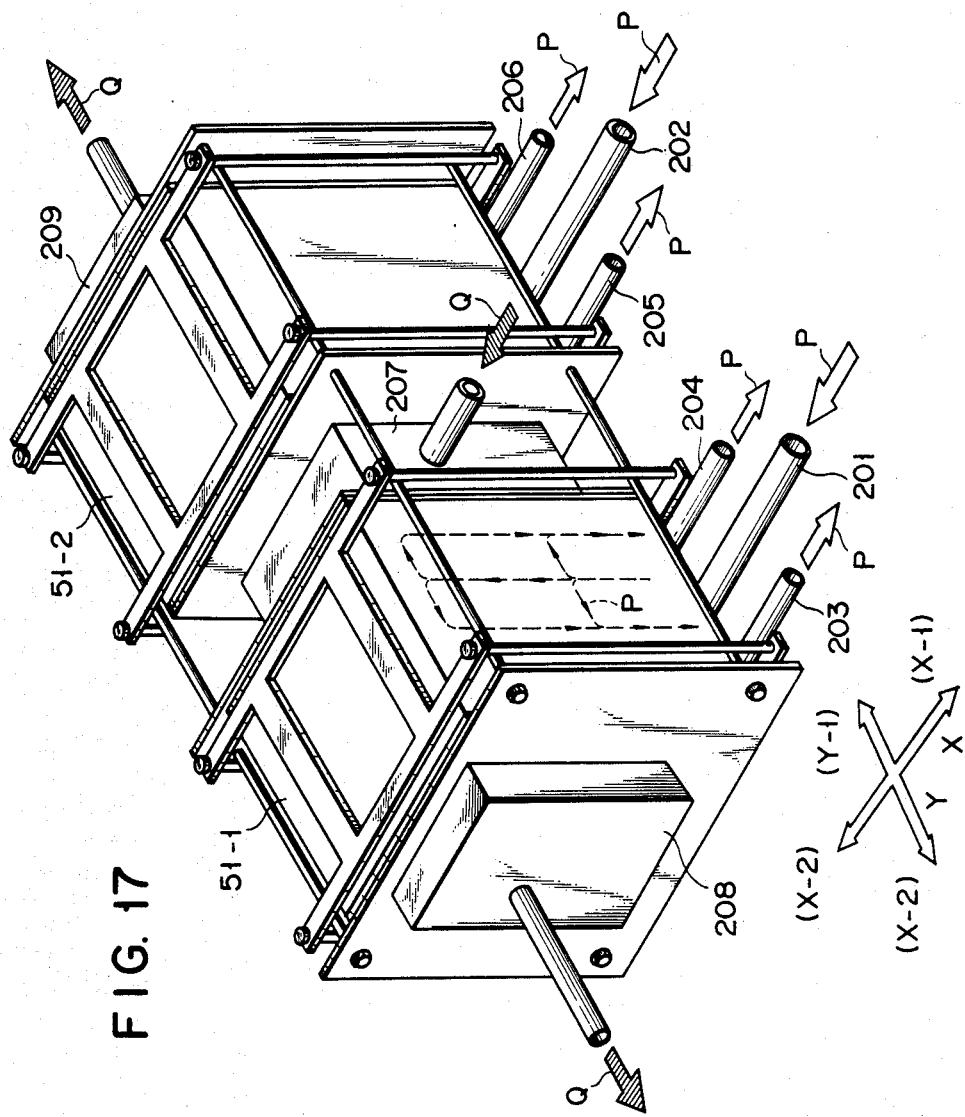
FIG. 17 is a perspective view of a fuel cell according to a fifth embodiment of the present invention.

Now, a fifth embodiment of the present invention will be described with reference to FIG. 17.

In the fifth embodiment, two stacked structures one each of counter flow type and co-flow type shown in the third embodiment, are combined, and oxidant gas flows in two directions, as in the fourth embodiment. More particularly, external manifold conduits 201 and 202 for taking in fuel gas to stacked structure 51-1 and 51-2 are provided under the centers of stacked structure 51-1 and 51-2, and external manifold conduits 203, 204, 205, 206 for exhausting the fuel gas, are provided under each side of stacked structure 51-1 and 51-2. Thus, as is indicated by broken lines in FIG. 7, fuel gas P circulates through the internal manifolds of the fuel cells, in the Y-2 direction, and is exhausted through manifold conduits 203, 205, while fuel gas P circulates through the inner manifolds, in the Y-1 direction, and is exhausted through manifold conduits 204, 206. Further, external manifold 207 for supplying oxidant gas is interposed between stacked structures 51-1 and 51-2. Then, external manifolds 208, 209 for exhausting the oxidant gas, are provided at those sides of stacked structure 51-1 and 51-2 which face away from each other. Oxidant gas Q, taken in through manifold 207, flows in the Y-2 direction, and is exhausted through manifold 208, while oxidant gas Q flows in the Y-1 direction, and is exhausted through manifold 109. Thus, both the gases counterflow at the inlet side of the oxidant gas, and flow in parallel at the outlet side of the oxidant gas. In addition, the flow of oxidant gas is split and made to flow in two directions. Therefore, the flow passages of the oxidant gas are relatively short. Thus, the electrode reactions proceed uniformly on the entire electrode surfaces, to allow a uniform current density distribution and temperature distribution.

In the first to fifth embodiments described above, the oxidant gas is supplied through the external manifolds. Thus, the oxidant gas passages can be large. Therefore, even when the oxidant gas flows in large quantity, to cool the fuel cells, the pressure loss of the oxidant gas is less in the fuel cell. Accordingly, both gases do not mix when the pressure loss of the oxidant gas is high. Thus, the operability of fuel cell can be remarkably improved.

Further, in the unit cell of the first to fourth embodiments described above, the anode electrode is situated under the electrolyte tile, and the cathode electrode is located on the electrolyte tile. However, the same experimental results as those of the above embodiments can be obtained even in the case of the unit cell in which the anode electrode is situated on the electrolyte tile and the cathode electrode is located under the electrolyte tile.

In the first, second, and fourth embodiments described above, even if Selmet (Trade name, manufactured by Sumitomo Metal Industries, Limited, Japan) is used instead of fuel gas channel plate 25 and oxidant gas channel plates 27, satisfactory experimental results can be obtained.

The material of the anode electrode is not limited to Ni-Cr alloy. For example, porous Ni plate treated with Cr may be used. Porous NiO plate may be used for the cathode electrode. The electrolyte tile may be hot-pressed under conditions of 460° C., at a pressure of 300 kg/cm$^2$.

In the first, second, and fourth embodiments described above, the shapes of the unit cell and the separator element are rectangular in the fuel gas flow direction. However, they may be of square or rectangular shape in the oxidant gas flow direction. The number of openings of the unit cell or separator element for forming the internal manifolds may be arbitrary.

What is claimed is:

1. A molten carbonate fuel cell comprising:
a plurality of unit cells formed of a plurality of plates each having opposed two flat square surfaces and four sides, each unit cell having a plurality of first and second side segment channels penetrating through said each plate, and a plurality of third segment channels penetrating through said each plate at a center location between side segment channels;
a plurality of separator elements formed of at least one plate having two opposed flat square surfaces and four sides, each separator element having first and second segment channels provided at positions corresponding to the plurality of first and second segment channels of said unit cell, third segment channels provided at positions corresponding to the plurality of third segment channels of said unit cell, first fuel gas passages provided on one side of said separator element, to communicate the first segment channels with the third segment channels of said separator element, second fuel gas passages provided on one side of said separator element, to communicate the second segment channels with the third segment channels of said separator element, and oxidant gas passages formed on the other side of said separator element, said plurality of separator elements being interposed between adjacent said unit cells to form a stacked structure in which the first segment channels of said unit cell communicate with the first segment channels of said separator element, to define a first internal manifold to communicate with the first fuel gas passages, the second segment channels of said unit cell communicate with the second segment channels of said separator element, to define a second internal manifold to communicate with the second fuel gas passages, and the third segment channels of said unit cell are communicated with the third segment channels of said separator element to define a third internal manifold to communicate with the first and second fuel gas passages, fuel gas flowing through the first, second, and third internal manifolds.

2. The molten carbonate fuel cell according to claim 1, further comprising:
fuel gas intake external manifold connected with said first and second internal manifolds, and fuel gas exhaust external manifold connected with said third internal manifold.

3. The molten carbonate fuel cell according to claim 1, further comprising:
fuel gas intake external manifold connected with said third internal manifold, and fuel gas exhaust external manifold connected with said first and second internal manifolds.

4. The molten carbonate fuel cell according to claim 1, wherein said oxidant gas passages are formed to perpendicularly cross said first and second fuel gas passages.

5. The molten carbonate fuel cell according to claim 3, wherein said oxidant gas passages are formed in parallel with said first and second fuel gas passages.

6. The molten carbonate fuel cell according to claim 4, wherein two stacked structures are provided, so that the oxidant gas passages thereof are opposed to one another, and comprise first oxidant gas external manifolds communicating with the oxidant gas passages between the two stacked structures, and second oxidant gas external manifolds communicating with the oxidant gas passages on those sides of the two stacked structures which face away each other.

7. The molten carbonate fuel cell according to claim 5, wherein two stacked structures are provided, so that the oxidant gas channels thereof are opposed to one another, and comprise first oxidant gas external manifolds communicating with the oxidant gas passages between the two stacked structures, and second oxidant gas external manifolds communicating with the oxidant gas passages on two those sides of the two stacked structures which face away from each other.

8. The molten carbonate fuel cell according to claim 1, wherein said plurality of first, second, and third segment channels are aligned in one row, in a direction perpendicularly crossing the first and second fuel gas passages.

9. The molten carbonate fuel cell according to claim 1, wherein said unit cells are provided with anode electrodes, cathode electrodes and electrolytes interposed therebetween, and a plurality of first and second openings for defining the first and second segment channels of said unit cells are provided at the anode electrode and the electrolyte, a plurality of third openings for defining the third segment channels of said unit cells are provided at the anode electrode, the cathode electrodes, and the electrolytes, and a plurality of first, second, and third openings for defining the first, second, and third segment channels are provided at the separator elements.

10. The molten carbonate fuel cell according to claim 1, wherein said unit cells are provided with anode electrodes, cathode electrodes, and electrolytes interposed therebetween, and a plurality of first, second, and third cylindrical conduits for defining the first, second, and third segment channels of said fuel cell are provided at the anode electrodes, the cathode electrode and the electrolyte, and a plurality of first, second, and third openings for defining the first, second, and third segment channels are provided at the separator elements.

11. The molten carbonate fuel cell according to claim 9 or 10, wherein said separator element is situated to communicate said fuel gas passages with the anode electrodes, and to communicate said oxidant gas passages with the cathode electrodes.

12. The molten carbonate fuel cell according to claim 1, wherein ridges are provided at the peripheral edges of said separator element, to define the fuel gas passages.

13. The molten carbonate fuel cell according to claim 1, wherein ridges are provided at both ends and the center of said separator element at said oxidant gas passage sides, to define the oxidant gas passages.

14. The molten carbonate fuel cell according to claim 1, wherein said fuel gas passages have a plurality of grooves.

15. The molten carbonate fuel cell according to claim 1, wherein said oxidant gas passages have a plurality of grooves.

16. The molten carbonate fuel cell according to claim 1, wherein said fuel gas channels contain porous material.

17. The molten carbonate fuel cell according to claim 1, wherein said third internal manifold is displaced to either one of the opposed sides thereof from the center of said stacked structure.

18. The molten carbonate fuel cell according to claim 1, wherein said separator element has coolant gas passages formed to perpendicularly cross said oxidant gas passages.

* * * * *